United States Patent [19]
Dommety et al.

[11] Patent Number: 6,078,575
[45] Date of Patent: Jun. 20, 2000

[54] MOBILE LOCATION MANAGEMENT IN ATM NETWORKS

[75] Inventors: Gopal Krishna Dommety, Columbus, Ohio; Malathi Veeraraghavan, Atlantic Highlands, N.J.

[73] Assignee: Lucent Technologies Inc., Murray Hill, N.J.

[21] Appl. No.: 08/882,991

[22] Filed: Jun. 26, 1997

Related U.S. Application Data

[60] Provisional application No. 60/027,259, Oct. 1, 1996.

[51] Int. Cl.$^7$ .................................................. H04L 12/38
[52] U.S. Cl. .......................................... 370/338; 455/456
[58] Field of Search ................................... 370/338, 256, 370/390, 395, 400, 407, 408; 455/432, 456, 435, 445

[56] References Cited

U.S. PATENT DOCUMENTS

| | | | |
|---|---|---|---|
| 5,815,816 | 9/1998 | Isumi ....................................... | 455/458 |
| 5,831,975 | 11/1998 | Chen et al. .............................. | 370/256 |
| 5,862,481 | 1/1999 | Kulkarni et al. ........................ | 455/432 |
| 5,901,142 | 11/1998 | Averbuch et al. ....................... | 370/329 |

OTHER PUBLICATIONS

The ATM Forum Technical Committee, "ATM User–Network Interface (UNI) Signalling Specification v 4.0", af–sig–0061.000 Letter Ballot, Jun. 1996, AF 95–1434R13.
The ATM Forum Technical Committee, "Private Network–Network Interface v1.0 (PNNI 1.0)", af–pnni–oo55.000 Letter Ballot, Mar. 1996, Section 4, pp. 39–46.
"A Fully Distributed Location Registration Strategy for Universal Communication Systems", J. Z. Wang, IEEE Journal on Selected Areas in Communications, vol. 11, No. 6, Aug., 1993, pp. 850–860.
"Mobility and Connection Management in a Wireless ATM Lan" K. Y. Eng et al., IEEE Journal on Selected Areas in Communications, vol. 15, No. 1, Jan. 1997, pp. 50–68.
"Efficient Routing of Information Between Interconnected Cellular Mobile Switching Centers", K. S. Meier–Hellstern et al., IEEE/ACM Transactions on Networking, vol. 3, No. 6, Dec. 1995, pp. 765–774.

*Primary Examiner*—Jason Chan
*Assistant Examiner*—Alexander Boakye

[57] ABSTRACT

The tracking of mobile terminals served by base stations supported by respective switches are formed into respective peer groups of switches in which the peer groups are then formed into a hierarchical logical network having a prescribed number of levels of scope S, and in which individual ones of the switches serve as a home switch for respective ones of said wireless terminals is enhanced. Specifically, responsive to receiving a registration message sent by one of the wireless terminals, the receiving switch notifies the home switch associated with the sending terminal. The home switch, in turn, notes the current location of that terminal and sends a similar message to the switch serving the zone in which the sending wireless terminal was last located. The latter switch, responsive to receipt of the message sets a pointer that points to (a) the current location of the sending wireless terminal if the switch is within the scope of the current location of the sending terminal or (b) the home switch if the switch is outside of the scope of the current location of the sending terminal.

39 Claims, 13 Drawing Sheets

CONFIGURATION OF A ZONE

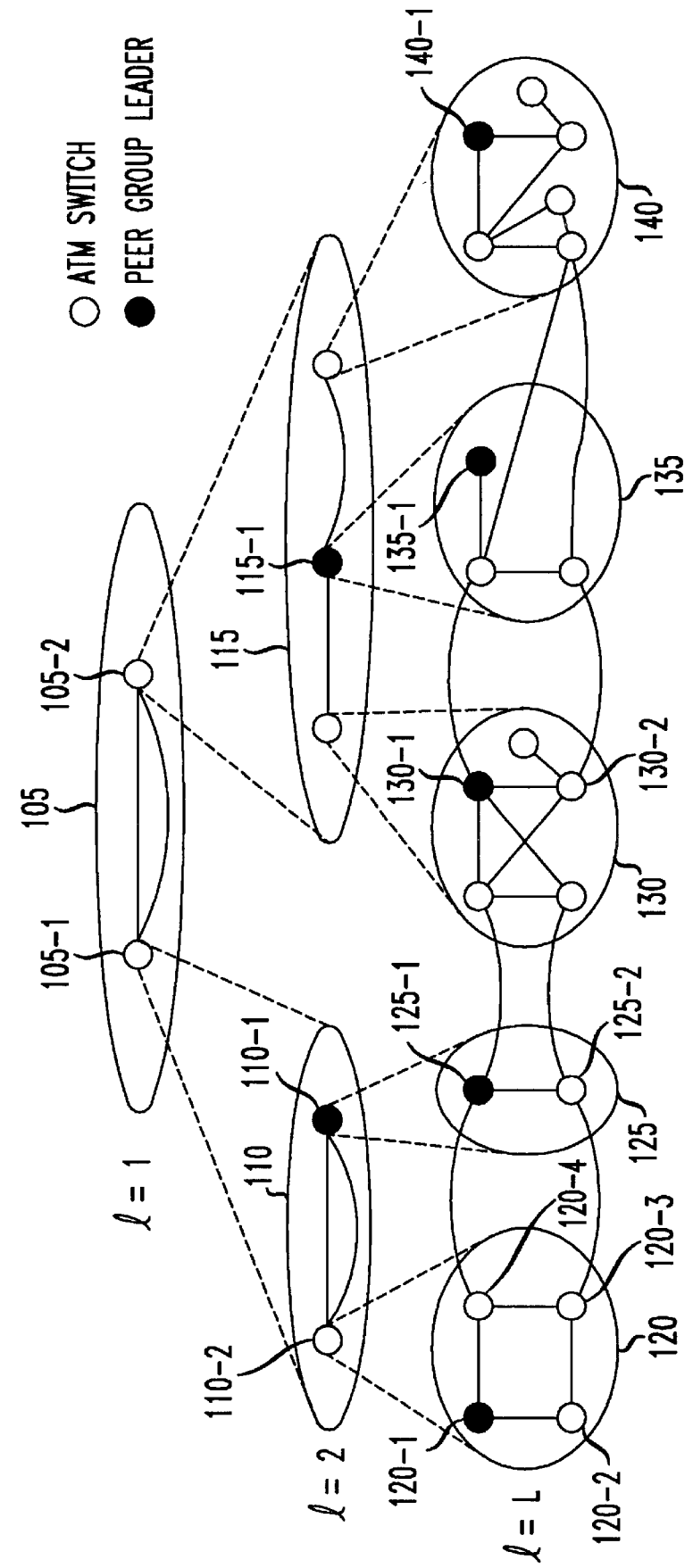

MOBILE LOCATION MANAGEMENT IN ATM NETWORKS

CROSS REFERENCE TO RELATED APPLICATIONS:

This application claims the benefits of Provisional U.S. patent application of Ser. No. 60/027,259 filed Oct. 1, 1996.

FIELD OF THE INVENTION

The invention relates to wireless Asynchronous Transport Mode (ATM) networks and more particularly relates to managing the location of a mobile terminal in a wireless ATM network.

BACKGROUND OF THE INVENTION

A wireless network is typically divided into a plurality of zones covering a plurality of cells. Each zone is served by a Mobile Switching Center (MSC) and each cell within the region is served by a base station. A wireless mobile station communicates with other stations (wireless or wired) via the base station covering the cell in which the station is located. When a mobile station leaves one zone and enters another zone, then it will begin to receive the identity of a base station within the other zone. At that point, the mobile station will note a change in the identity of the zone that it has been tracking, and, therefore, concludes that it has entered another zone. The mobile station announces its presence in the latter zone by "re-registering" with the latter base station.

Managing the tracking of a mobile station as it "roams" from one zone to another zone is an important aspect of wireless networking. One such prior managing scheme uses a Home Location Register (HLR) specified by the so-called IS-41 standard to store the identity of the current (or last known) region covering the zone in which a wireless mobile is located. It also uses a so-called Visitor Location Register (VLR) at the region level to store the identity of the zone that the mobile is currently located. If the wireless mobile moves from a first zone to a second zone, then the mobile station re-registers with a base station in the second zone, as discussed above. The latter base station then notifies its associated MSC that the location for the mobile has changed. The MSC, in turn, updates the contents of the associated VLR to reflect the mobile's new location. If the mobile then moves to another zone within another region, then the tracking of the mobile proceeds similarly in the other region. However, in this instance, the VLR associated with the other region will note that the mobile represents a new tracking entry and, therefore, notifies the HLR associated with the mobile that the mobile is now in a region served by the latter VLR. That VLR also notifies the former VLR to cancel its tracking of the mobile. Thus, in this two-level hierarchical scheme the HLR tracks which VLR a mobile is in, and the VLR tracks which of its zones (and thus the MSC) is covering the mobile. (Note that the area covered by VLR is referred to as a "region".)

Thus, if a telephone call is placed to a mobile from a distant region, then the MSC at the distant region sends a query to the HLR to obtain the location of the called mobile. The HLR, in turn, identifies the VLR now serving the mobile based on the contents of the home register associated with the mobile. The HLR then notifies the identified VLR via the associated network that a call is to be routed to the mobile. The identified VLR similarly notifies the MSC serving the zone in which the mobile is located. That MSC then returns a so-called Temporary Local Dialing Number (TLDN) that is to be used as the mobile identification Number in the routing of the call. The VLR also uses the TLDN to identify the mobile. The VLR then sends the TLDN to the HLR, which then forwards the TLDN to the MSC handling the call.

The locating of the mobile thus involves the sending of a signaling message from the HLR to the VLR, the re-sending of the signaling message from the latter VLR to the MSC currently tracking the mobile, a return signaling message from that MSC to its VLR, the re-sending of the return message from that VLR to the HLR, and the re-sending of the return message from the HLR to the local MSC handling the call. The latter MSC then routes the call to the distant MSC based on the TLDN assigned to the call.

An example of the mobile location procedure specified by the IS-41 standard is illustrated in FIG. 1A. Specifically, in response to an incoming call directed to a particular mobile, either the switch that received the incoming call from a calling party (originating switch) or the home switch associated with the called mobile sends a so-called Location Request (LOCREQ) message to the HLR supporting the called mobile. That HLR, in turn, sends a so-called Route Request (ROUTEREQ) message to the VLR from which it received the last registration message for the called mobile. That VLR in turn sends the ROUTEREQ message to the MSC. The MSC, in response to receipt of the ROUTEREQ message, assigns a TLDN (i.e., Temporary Location Directory Number) to the called mobile and returns this value in its response. The routing of the connection through the network is then done using the assigned TLDN identifying the far end MSC associated with the called mobile. When a conventional call setup message reaches the far end MSC, then that MSC pages its associated base stations as a way of locating the base station serving the cell in which the called mobile is located. (Note that the VLRs and MSCs need not exchange such messages if they are collocated with one another.)

It may be appreciated that the foregoing locating scheme is complex and uses an appreciable amount of processing time to set up a call.

Another proposed tracking scheme (referred to as "flat tracking") uses one level of tracking when a mobile is located within its "home" region/network and uses two levels when the mobile is located within another region/network. Specifically, when a mobile is in its home region, then it is tracked directly by the HLR, and when it is in another region, then the HLR is used to track the VLR of the other region. The latter VLR, in turn, tracks the location of the mobile. Also, for the latter case, the VLR assigns the TDLN, rather than the MSC. FIGS. 1B and 2 respectively illustrate in a logical manner the signaling that occurs for the one level and two level cases. For the one level case, HLR 5-1 tracks the locations of all mobiles assigned to the associated "home" network. In that case, if a user at wireless mobile $m_2$ places a call to a user associated with wireless mobile $m_1$, then, responsive to the call, MSC 5-3 sends a locate message to HLR 5-1, which has been tracking the mobiles that are within their home location served by HLR 5-1. Since that applies to wireless mobile $m_1$, then HLR 5-1 returns to MSC 5-3 a TLDN that is to be used in setting up the call to MSC 5-2. MSC 5-3, in turn, forwards a call set-up message containing, inter alia, the supplied TLDN and Mobile Identification Number (MIN) associated with wireless mobile $m_1$ to MSC 5-2.

If, on the other hand, wireless mobile $m_1$ "roams" to a remote region as shown in FIG. 2, then its location is tracked in the manner discussed above, i.e., via VLR 5-4. However, in the improved scheme of FIG. 2, if wireless mobile $m_2$ places a call to $m_1$, then the TLDN is provided by VLR 5-4 (which covers the region in which wireless mobile $m_1$ is currently located) rather than MSC 5-5 currently serving wireless mobile $m_1$ at the remote location.

In addition, VLR 5-4 assigns a TLDN based on the MSC at which the mobile is currently located. For example, if the area code plus exchange code for MSC 5-5 is, e.g., 415-949, then VLR 5-4 assigns a TDLN of 415-949-0000 and returns that number to HLR 5-2, where "0000" identifies a call to a mobile terminal. Thus, by combining the function of a one-level tracking scheme for mobiles located in their home regions, and the assigning of a TLDN by an HLR or VLR, rather than an MSC, the location and call set-up procedures for home mobiles only involves a one hop message exchange instead of a three hop exchange, as would be the case in an IS-41 network (FIG. 1A).

Another proposed hierarchical location management scheme, which supposedly reduces long-distance signaling for tracking mobiles and location management is shown in FIG. 3. The node at the highest level is arbitrarily designated "earth", which is followed by a next tier of nodes representing respective countries. For example, the first node in the latter tier represents the U. S., which is followed by still another tier of nodes representing states or regions within the identified country, e.g., node 1 representing Florida. The latter tier of nodes serve mobiles, m, and other endpoints, such as mobile data terminals, E. Thus, a node tracks the location of the mobiles that are below it in the hierarchy. The earth node tracks the locations of mobiles covered by the level of nodes just below it, i.e., the country nodes. The latter nodes similarly track the locations of mobiles covered by their associated nodes positioned at a next lower level, e.g., the state nodes, and so on. If a wireless mobile $m_3$, whose home node is node 1, moves to node P-Q then the system, in response to the move (which move is announced as a result of wireless mobile $m_3$ re-registering with node P-Q) sets up a chain of pointers as shown in FIG. 3 from the home node 1 to node P-Q. If another mobile or endpoint, e.g., endpoint $E_n$, then places a call to wireless mobile $m_3$, node P sends a call set-up message to node Y in the direction of the home node (node 1) associated with wireless mobile $m_3$. Since node Y has a pointer/entry noting that node P-Q is the location of wireless mobile $m_3$ then the upward migration of the message stops at node Y, which then sets up a connection to node P-Q. The chain of pointers thus obviates the need to perform long distance signaling between one end node, e.g., node P, and a home node, e.g., node 1, to establish a connection to a mobile that has moved from its home location to a remote location. Moreover, if wireless mobile $m_3$ continues to move, for example, moves to node P, then the mobile tracking updates generated as a result of such moves propagate up to node Y only. In that instance, only node Y changes its pointer from node P-Q to node P for wireless mobile $m_3$.

It is apparent from the foregoing schemes that the prior art strives to reduce the amount of time and cost expended in tracking the location of a wireless mobile, e.g., a wireless data terminal, as well as the time and cost expended in setting up a call to a wireless mobile.

SUMMARY OF THE INVENTION

The relevant art is advanced in accordance with our invention which forms a network of switches into respective peer groups of switches each serving a plurality of base stations that communicate with wireless terminals within the respective cells of the base stations, in which the peer groups are then formed into a hierarchical logical network having a prescribed number of levels, and in which individual ones of the switches serving as a home switch for respective ones of said wireless terminals. Responsive to receiving from an associated base station a registration message originating from one of the wireless terminals, the receiving switch generates a message identifying the current location of the sending wireless terminal and sends the message to the home switch associated with the sending wireless terminal, as well as to the previous switch serving the zone in which the sending wireless terminal was last located. The home switch, in turn, sets a pointer that points to the current location of the sending wireless terminal. The previous switch, responsive to receipt of that identifying message also sets a pointer that points to (a) the current location of the sending wireless terminal if the previous switch is within the scope of the current location of the sending terminal or (b) the home switch if the previous switch is outside of the scope of the current location of the sending terminal.

These and other aspects of our invention will become apparent from the following detailed description and accompanying drawings.

BRIEF DESCRIPTION OF THE DRAWINGS

In the drawing:

FIG. 4 illustrates a network of switches arranged to implement a so called Private Network-Network Interface routing protocol;

DETAILED DESCRIPTION

Figure 1A:
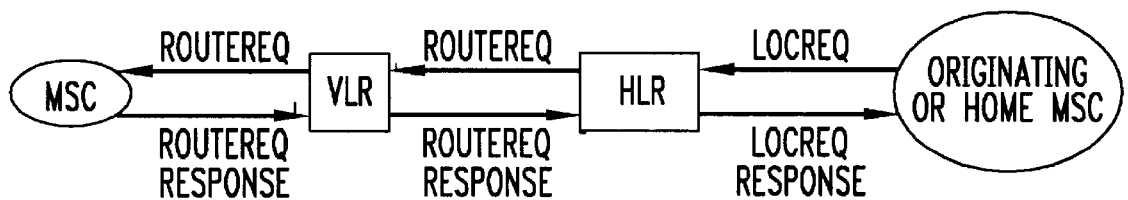
FIGS. 1A, 1B, 2 and 3 illustrate mobile terminal tracking arrangements suggested by the prior art.
Figure 1B:
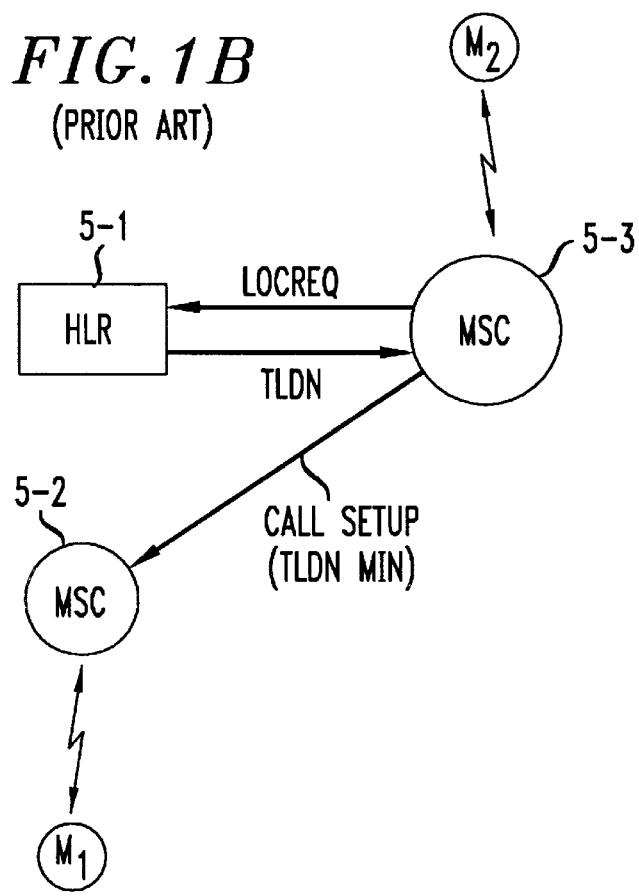
Figure 2:
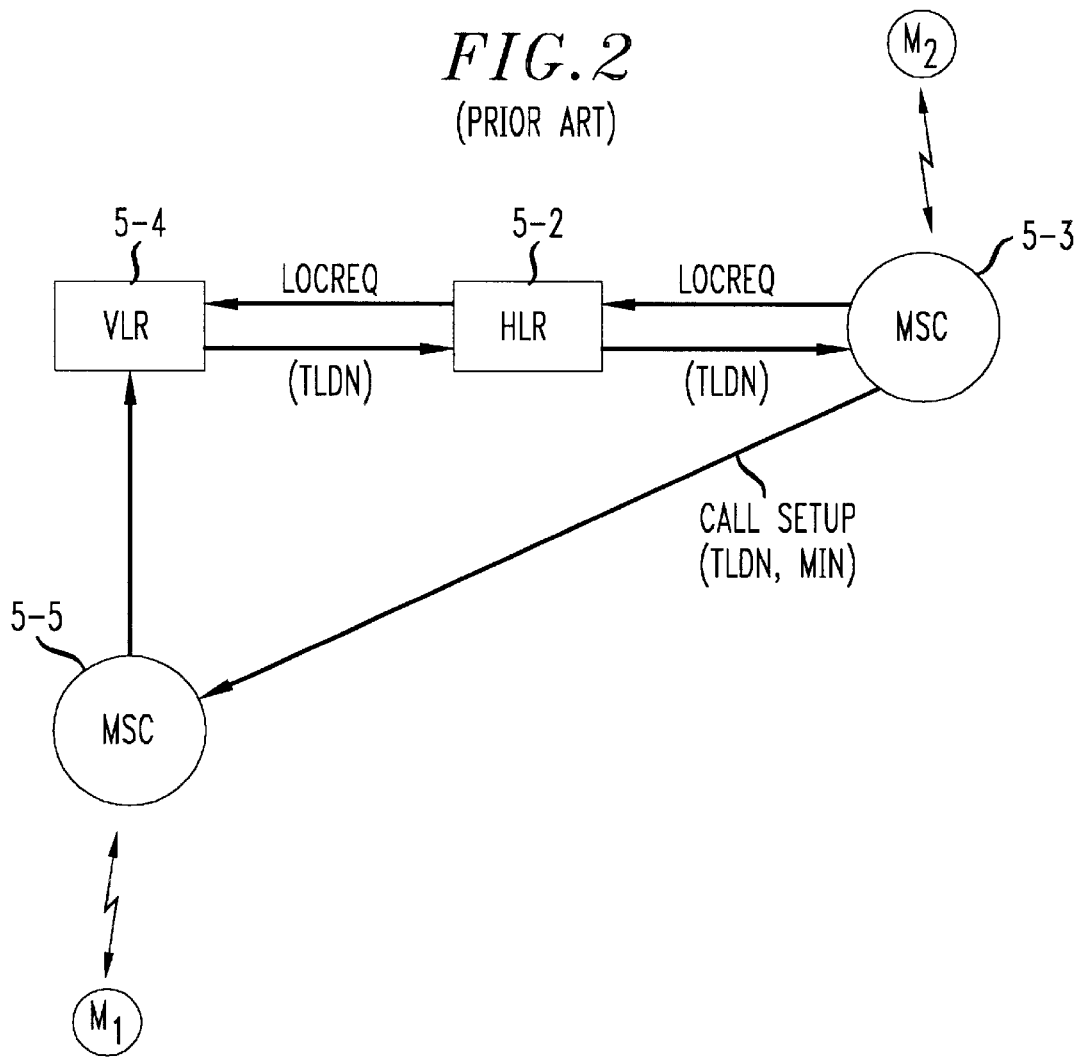

The following description is preceded by a brief overview of the so-called Private Network-Network Interface (PNNI) routing protocol. The claimed invention is then discussed in the context of a PNNI based hierarchical ATM network. Specifically, PNNI based ATM networks are arranged in hierarchical peer groups, e.g., groups 120, 125, 130, 135 and 140 as shown in FIG. 4. At the lowest level of the network, level (l=L), ATM switches, e.g., switches 120-1, 120-2, 120-3, and 120-4, (represented by circles) are shown connected in arbitrary topologies, in which a so-called Peer group Leader (PGL) is arbitrarily appointed in each peer group (A PGL is shown as a filled in circle, e.g., PGL 120-1, 125-1, 130-1, 135-1, 140-1, etc.), where L is the number of a respective level in the hierarchy. The PGL node/switch represents the peer group at the next higher-level peer group, and is designated the Logical Group Node (LGN). For example, node 120-1 is assumed to be the PGL of peer group 120. In this role, node 120-1 performs the functions of an LGN as a member of peer group 120. Nodes (ATM switches) within a peer group exchange detailed PNNI Topology State Packets (PTSPs) relating to the topology and loading conditions of its associated peer group. A PGL, e.g., PGL 120-1, summarizes topology and loading information received within its peer group, and, as the LGN, generates and sends PTSPs to members of the higher-level peer group. For example, node PGL 120-1 as LGN 110-2, summarizes loading and reachability information relating to peer group 120 and sends the information to other LGNs of the associated peer group. Each member of a higher-level peer group that receives such information then sends it to the members of its child peer group (downward flow). The exchange of topology and loading information constitutes the PNNI routing protocol, which is disclosed in detail in the ATM forum standard entitled "Private Network-Network Interface v1.0 (PNNI 1.0)" published by the ATM Forum Technical Committee, March 1996, as publication af-pnni-0055.00, which is hereby incorporated by reference.

Thus, each node in a PNNI based network receives complete topology/loading information concerning its lowest-level peer group, and also receives topology/loading information concerning its ancestor peer groups.

For example, node 120-2 receives and stores the topology information for peer groups 105, 110 and 120. The node uses such information to determine the routing for a received call.

As a result of the sending of the PTSPs, reachability information is thus propagated among nodes to indicate where the various endpoints, e.g., wireless mobiles/terminals, are located. Endpoint addressing is based on a format called Network Service Access Point (NSAP) addressing, which is disclosed in the ATM forum standard entitled "ATM User-Network Interface (UNI) Signaling Specification version 4.0", published by the ATM Forum Technical Committee, March 1996, as publication ATM Forum/95-1434R9, which is hereby incorporated by reference. The three forms of NSAP addressing support hierarchical addressing. The prefix of an NSAP address identifies the peer group in which the endpoint is located. Nodes/switches within a peer group thus accumulate accurate reachability information for the endpoints within the associated peer group, in which the information identifies the switch at which each endpoint is located. However, other peer groups may access a summary of such reachability information. For example, the data in the topology databases of the switches in peer group 140 (FIG. 4) indicate that the endpoints having address prefixes associated with "peer group 105-1" (i.e., the node/switches below 105-1) may be reached through peer group 105-1. PTSPs carrying updates to the "reachability" data also propagate up and down the hierarchy, as mentioned briefly earlier for the PTSPs carrying the topology and loading information. "Reachability" information provided by a node is associated with a scope value identifying a level in the PNNI hierarchy for such information. Moreover, the scope value is the highest level at which the scope level may be advertised or summarized, as disclosed in the aforementioned ATM Forum publication af-pnni-0055.000.

Figures 3, 5:
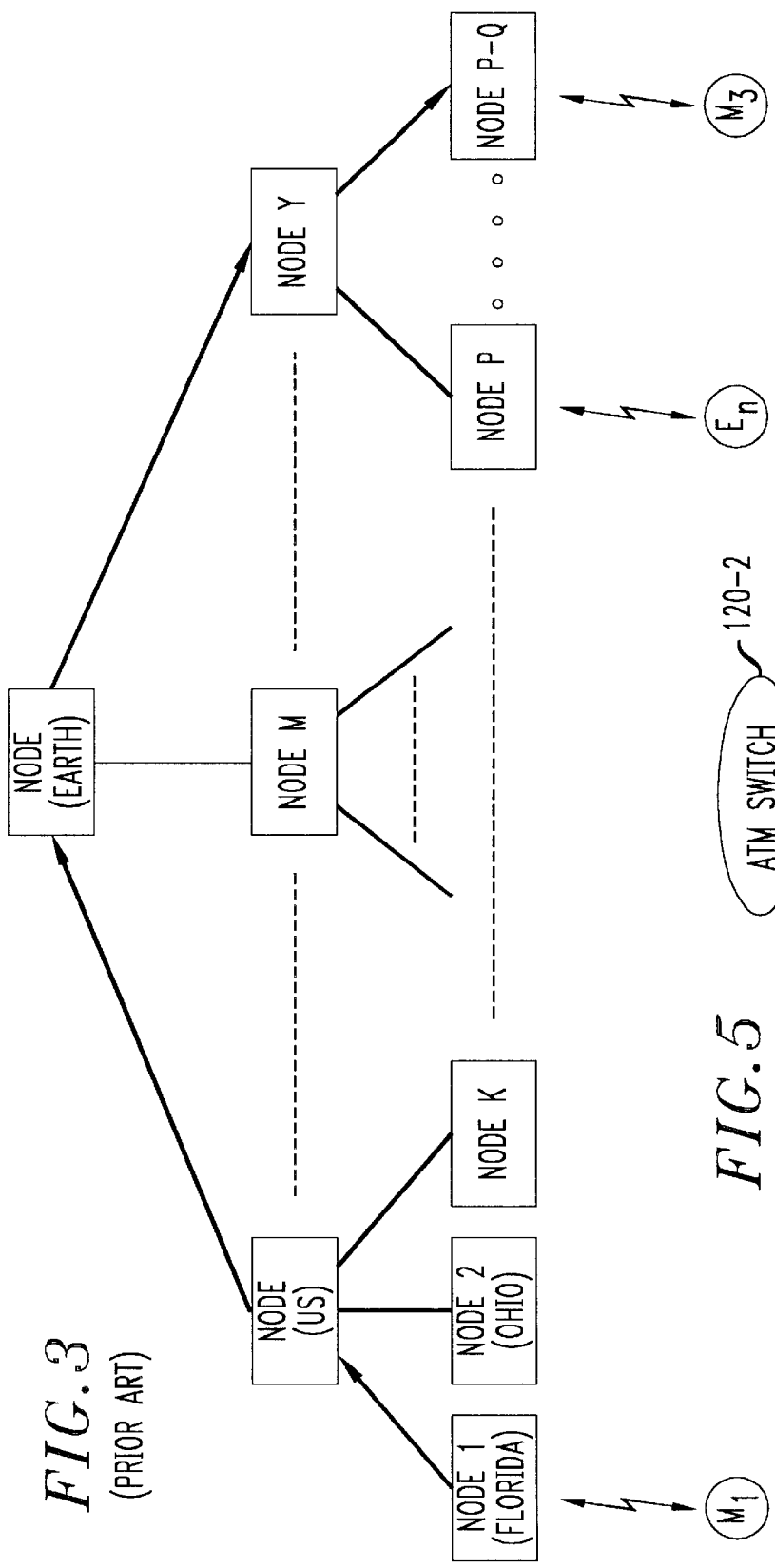
FIG. 5 illustrates the way in which a plurality of base stations are connected to a switch, such as an ATM switch.

Mobile endpoints, e.g., a mobile data terminal, may be supported in the PNNI hierarchical architecture in the following manner. Specifically, the mobiles within (located at) base stations are assumed to be organized similar to the way they are organized in cellular networks as shown in FIG. 5, which illustrates a plurality of base stations 121-i connected to a switch, e.g., switch 120-2 (which is also shown in FIG. 4). Zone-change registrations are used to limit air interface registration traffic, where a "zone" comprises all of the base stations under a single switch. When a switch receives a call setup message, the switch pages all of its base stations to locate the base station that is serving the called mobile/endpoint. (Note that general configurations which allow a base station to be connected to multiple switches, and/or with different definitions of zones, are possible.) The network configuration shown in FIG. 5 corresponds to the architecture of FIG. 4 at the lowest level (L level) and particularly points out that a number of the ATM switches may be connected to a set of base stations offering wireless access to mobile endpoints.

Figure 11:
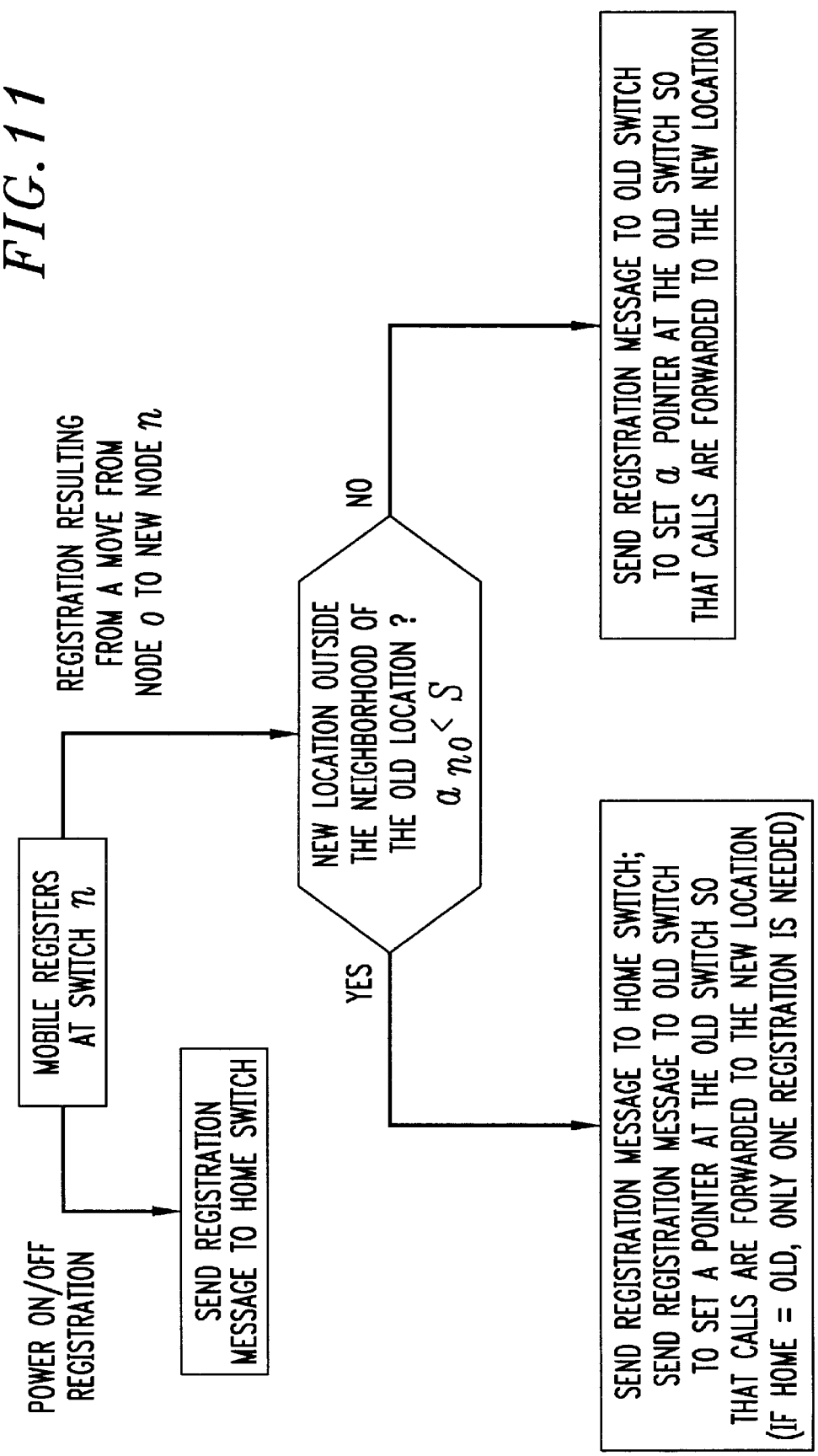
FIGS. 11–14 illustrate in flow chart form the various programs which implement the principles of the invention a network of such switches.

Specifically, when a mobile "powers up" (or powers down) or changes locations, conventional mobile tracking procedures set so-called "forwarding" pointers at the home location and old location (i.e., previous location in the case where a mobile endpoint roams from one location to another ('moves')), as shown in FIG. 11. Such procedures also send limited reachability updates (with a scope S) to other switches in accordance with the PNNI routing protocol. The call forwarding pointers are set so that a call originating at a switch located outside of the associated scope S as well as a call originating at a switch within the associated scope S prior to the completion of the reachability information update (resulting from a move) may still be routed properly to the mobile endpoint at its current location.

Figure 6:
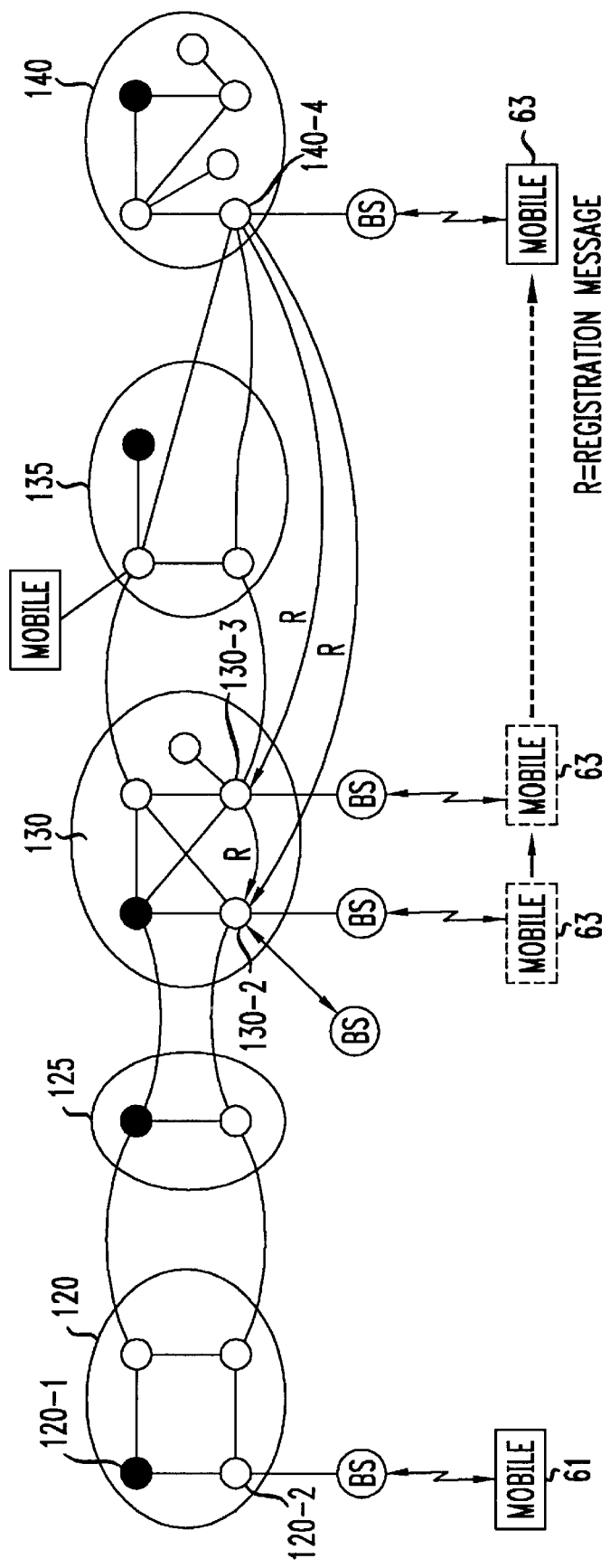
FIGS. 6, 7 and 8 illustrate a network of switches arranged to implement the principles of one embodiment of our invention.

If a "power up" registration is received from a mobile via a base station, then the ATM switch serving that base station and thus receiving the registration therefrom sends a message to the home switch for that mobile (as is seen in FIG. 11). As the mobile moves, a forwarding pointer pointing to the previous location is updated so that calls that arrive at the previous location may be routed to the new location. If the old/previous location is outside the scope S of the new location, then the forwarding pointer at the home switch is updated to point to the new location ("neighborhood"). For example, assume that mobile endpoint 63 (shown as a dotted rectangle), FIG. 6, is currently being served by a base station connected to switch 130-2 that serves as the home switch for mobile 63. If mobile 63 moves to a base station under the same switch, then that switch does not send registration update data to the associated network. If mobile 63 moves (roams) to a base station served by, e.g., switch 130-3, then that switch sends a registration message to switch 130-2 (as shown in FIG. 6 by the letter R). As a further example, if mobile 63 then moves to switch 140-4, then switch 140-4 sends a registration message to the home switch 130-2 and to the old/previous switch location 130-3 so that forwarding pointers pointing to switch 140-4 may be set at those switches (as is seen in FIG. 11).

Note that the forwarding pointer at switch 130-3 may be deleted after the updated reachability information has reached all of the intended nodes. In an illustrative embodiment of the invention, that pointer may be deleted automatically after a particular amount of time has elapsed following the setting of the pointer at switch 130-3.

Figure 12:
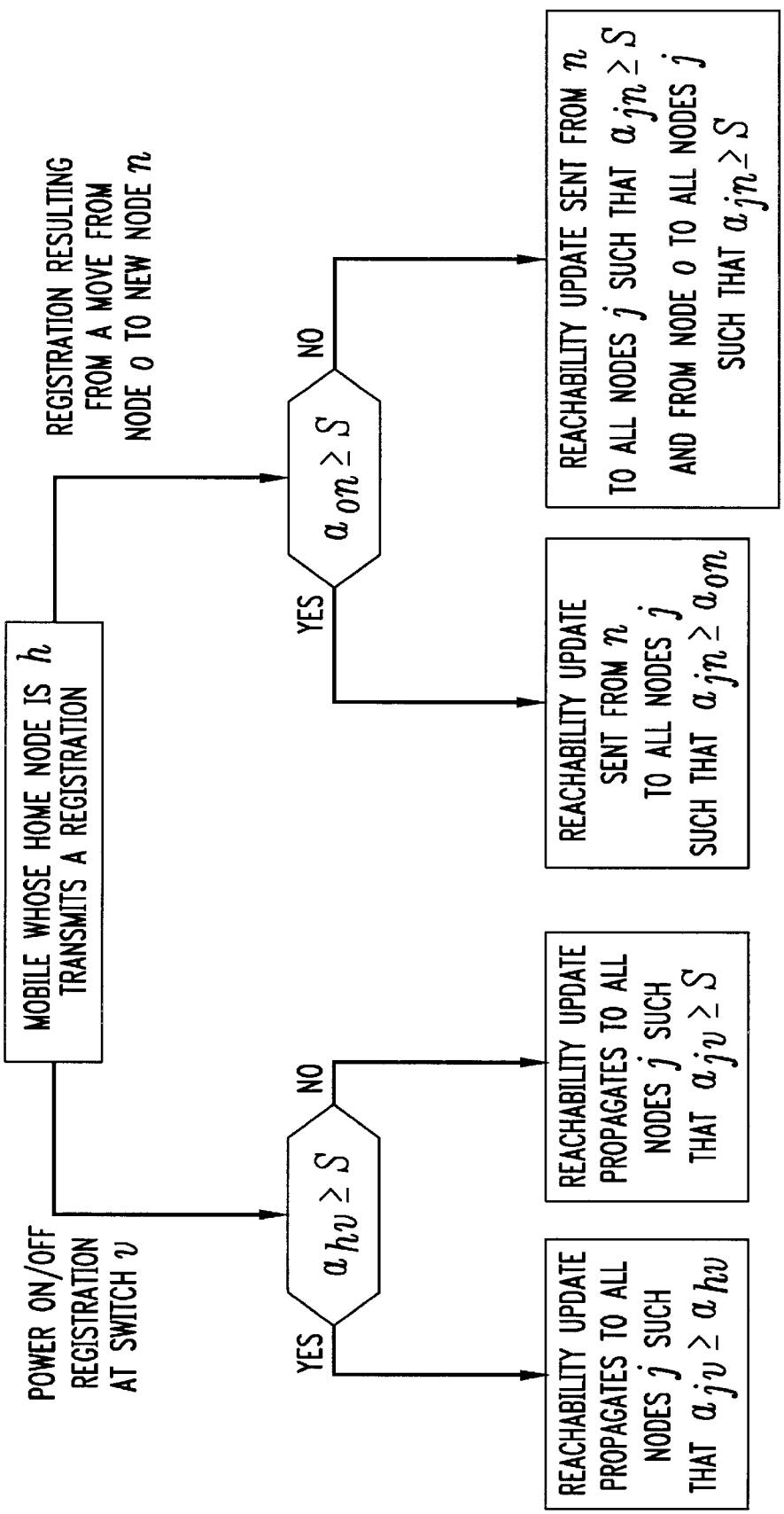

Following the setting of the forwarding pointers, topology information characterizing significant changes in the PNNI routing protocol may be distributed to generate reachability updates. The scope of the distributions is used to set the stopping point for the propagation of the reachability information as mentioned above. If a mobile "powers up" at a node within the associated scope S of its home node, then the reachability updates propagate only up to a particular level (as described in FIG. 12), beyond which the reachability data does not change. For example, if S=2 and mobile 61 (whose home switch is switch 120-1), as shown in FIG. 6, powers up within a cell served by switch 120-2, then the reachability updates only propagate to the nodes in the associated peer group 120. Note that, even though S=2, logical switch 110-2 (FIG. 4) does not send a PTSP to logical switch 110-1 (FIG. 4), since there is no change in the reachability data stored in switch 110-2 relating to mobile 61. If a mobile powers up at a node outside of the scope S of its home switch, then reachability updates propagate up to some level S. For example, if mobile 61 powers up at a base station served by switch/node 125-2, FIG. 4, then reachability updates identifying mobile 61 are distributed to each switch in the peer group served by logical switch 110-1. The PGL (switch 125-1 serving as the PGL) then sends PTSPs carrying the summarized reachability updates to LGN 110-2. The PTSPs then propagate downwards from LGN 110-2 to its child peer groups. As a mobile moves, and the previous/old location is within the region defined by the scope S of the new location of the mobile, then reachability updates are sent up to some level K beyond which there is no need to change such reachability data (see FIG. 12). If not, then the reachability data propagates up to level S from the new location of the mobile. In addition, a reachability update procedure is initiated by the previous switch to notify all of the nodes within the same region S as the previous switch that the mobile is now reachable through its home switch.

In the foregoing example, it is apparent that a switch/node which receives a registration request/message from a mobile endpoint that is roaming cannot determine the identity of the last previous switch that served the mobile. We deal with this problem by arranging a mobile so that, in accord with an aspect of the invention, it includes the identity of the previous switch in the zone-change registration message that it sends to the base station that is serving the zone in which the mobile is currently located. For example, in the above example, whenever an end point, e.g., mobile 63, moves from the zone served by switch 130-2 to the zone served by switch 130-3, mobile 63 includes the identity of switch 130-2 in the registration message that it sends to the base station served by switch 130-3.

(It is noted that mobility related signaling messages, such as a registration message, may be sent from one switch to another switch in accordance with the following procedures: (a) a new signaling message that is recognized by all switches may be readily defined such that a switch that receives such a message simply forwards it to the destination node; (b) using a Switched Virtual Circuit (SVC) path between the network switches for the purpose of exchanging signaling messages; and (c) using connectionless packet service, for example, the Internet Protocol (IP) or so-called connectionless ATM message service, to send signaling messages.)

We have recognized that if the identity of the previous switch is its ATM address, then the new switch, e.g., switch 130-3, needs to set up a Switched Virtual Circuit (SVC) to the previous switch, e.g., switch 130-2, to send the registration data to the previous switch. It can be appreciated that the procedure for setting up a SVC is somewhat slow, since it incurs a delay. We deal with this problem, in accord with an aspect of the invention, by using switch IP (Internet Protocol) addresses rather than ATM addresses. An ATM switch thus supplies its IP address to a mobile. If the mobile thereafter changes zones, then the mobile supplies the IP address of the previous ATM switch to the ATM switch serving the zone in which the mobile is currently located. (Similarly, the latter switch supplies its IP address to the mobile.) Accordingly, the new switch may then send the registration data as an IP packet which is routed as a datagram to the previous switch. (The standard protocol for sending an IP packet over ATM facilities is disclosed in the IETF RFC 1577 entitled "Classical IP and ARP over ATM", November, 1996 by M. Lauback, which is hereby incorporated by reference. Note that a copy of the latter reference is published on the World Wide Web.)

Figure 7:
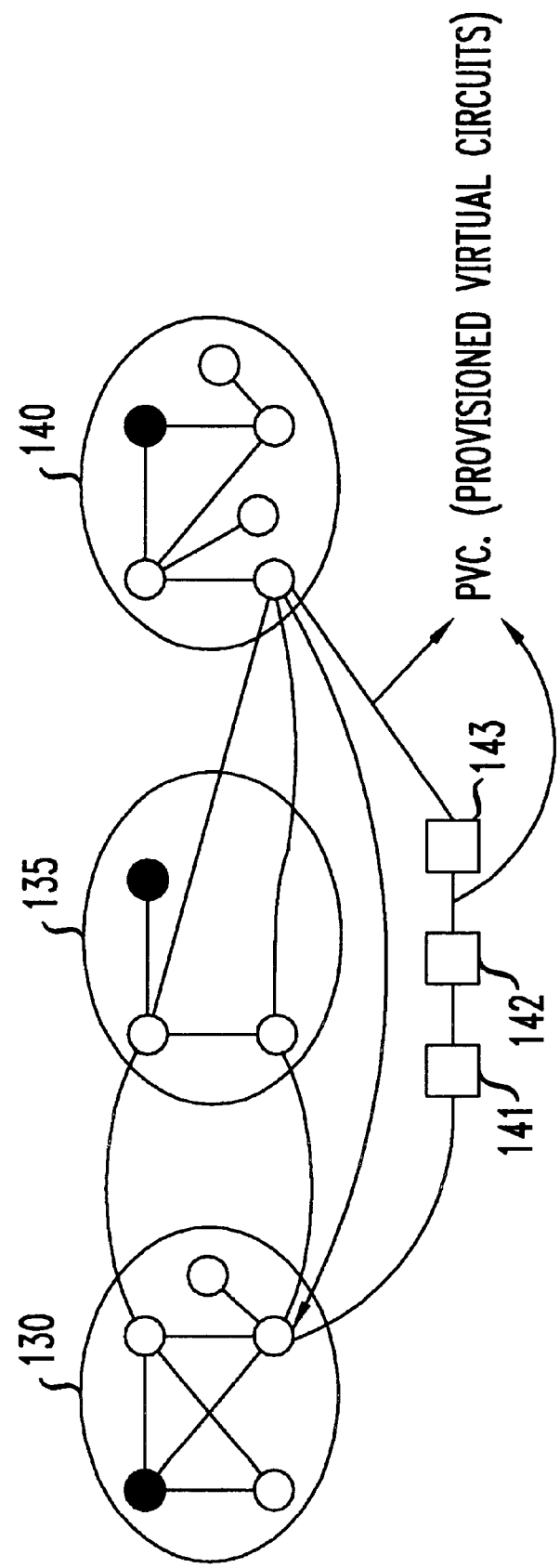

Note that if a SVC needs to be established prior to the sending of an IP packet, then it may be simpler to store the ATM addresses of system switches in a respective mobile and arrange the mobile to send the ATM addresses as parameters in the zone-change registration data. This may avoid so-called address resolution delay. If, on the other hand, Provisioned Virtual Circuits (PVCs) are set up a priori from switches to IP routers, and between IP routers (e.g., routers 141, 142 and 142) as shown in FIG. 7, then the delivery of registration data containing IP addresses via the router network will be faster than via a conventional virtual circuit using ATM addresses. For clarity, routers 141 through 143 (R) are shown in FIG. 7 outside of their respective peer groups. We refer to this type of network, in which IP routers are interconnected with PVCs, as an IP overlay network, and use it for the sending/receiving of location management messages. Note that in the network of FIG. 7 a PVC may also be used to send a message from a "new" switch directly to the previous switch. A small number of PVCs may be needed at a switch for this purpose, since there are only a few switches that have base stations adjacent to the base stations of a particular switch.

Figure 13:
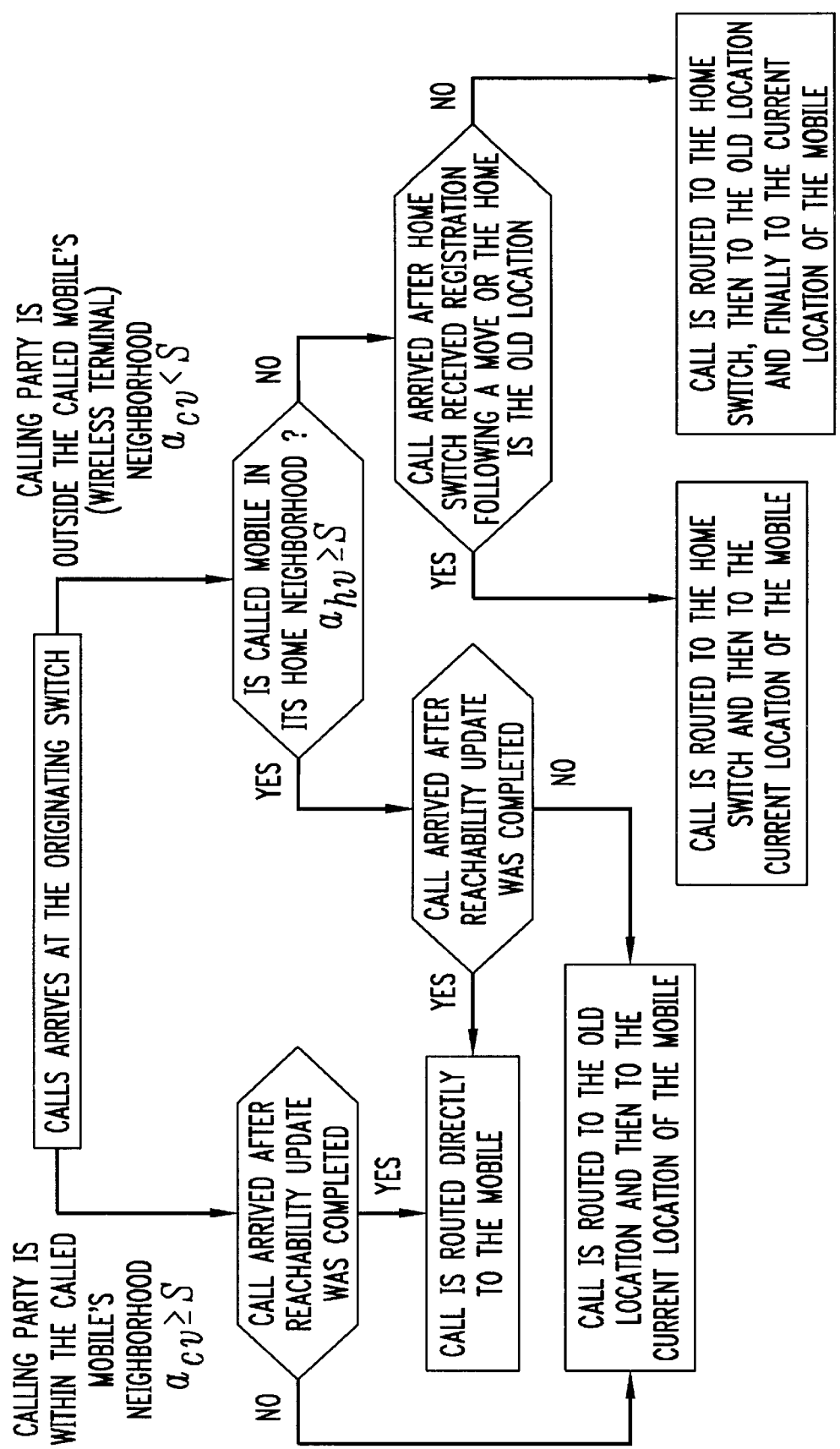

It may be appreciated from the foregoing, that in our mobile PNNI approach an explicit mobile location procedure is not invoked prior to "setting up" a connection. A connection is thus set up somewhat "on the fly" by each switch in the network "believing in" the accuracy of the reachability data stored in an associated memory (not shown). The way in which an incoming connection to a mobile is routed in our mobile PNNI scheme is shown in FIG. 6. The path/route taken to the mobile depends on the respective locations of the calling, home location and current/visiting of the called mobile. If the calling party is in the "neighborhood" of the called mobile or the called mobile is in its home neighborhood, then the call is routed directly to the latter mobile. (The term "neighborhood" includes all of the switches within scope S of the called terminal/mobile terminal) Otherwise, the call is first routed to the home switch, since the ATM switches outside the neighborhood of the mobile have so-called "default reachability" information. Thus, the home switch forwards the call to the current location of the mobile (as shown in FIG. 13). If the mobile has moved recently, the selected path/route may also depend on whether (a) the call arrives after reachability updates for the called mobile have propagated through the network and forwarding pointers gave been set accordingly, or (b) the call arrives prior to the completion of the propagation of the reachability update and/or the setting of forwarding pointers.

Figure 8:
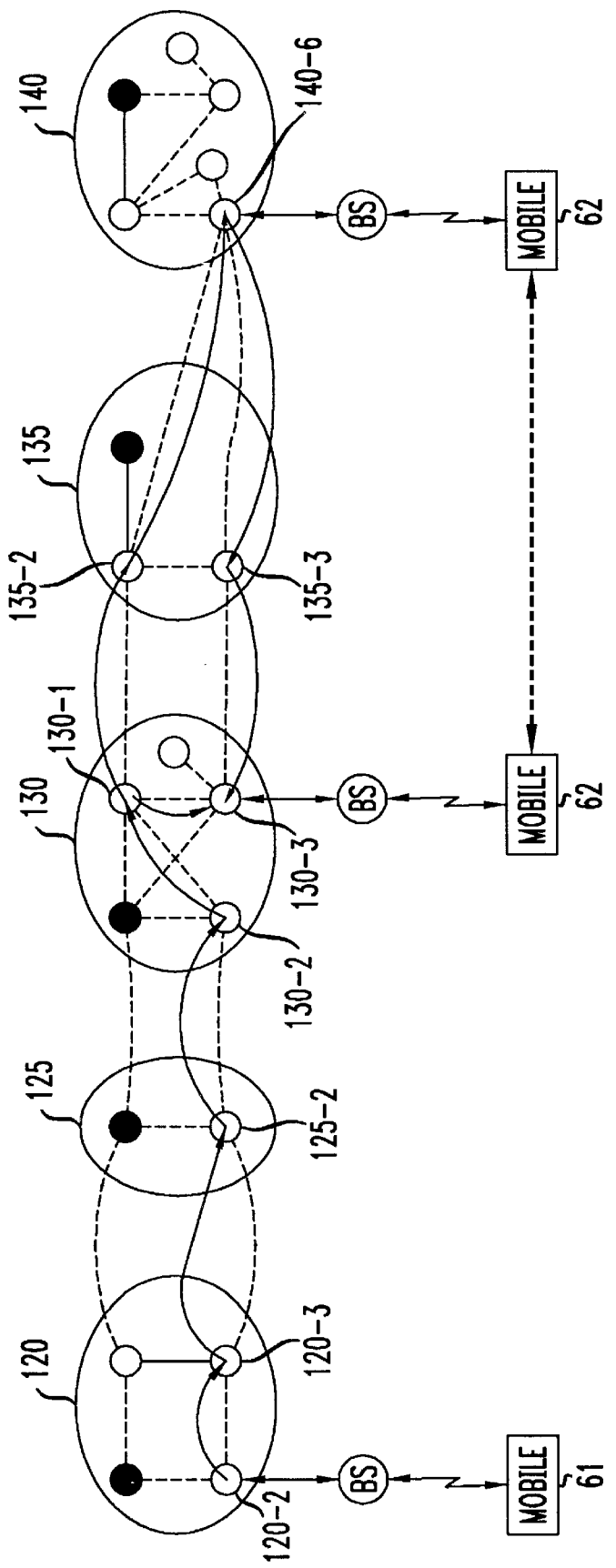

Consider, for example, that mobile 61, FIG. 8, sends a call setup message to mobile 62 currently located in the zone served by switch 130-3. The call setup message is transported through peer groups 110-1 and 110-2 (FIG. 4) and to the peer group 130, namely switch 130-3, under logical node 105-2. The message is transported in this way since reachability information stored for each of the switches/nodes in the peer group under logical node 105-1 indicates that mobile 62 is in its home peer group. When the call setup message arrives at the peer group under logical node 105-2, it is then routed to switch 130-3, since all of the switches in peer group 130 have stored the correct reachability information.

Now assume that mobile 62 moves from the zone served by switch 140-6 to the zone served by switch 130-3. If the call setup message arrives at switch 130-2 before that switch receives the updated reachability information identifying the latter move involving mobile endpoint 62, then switch 130-2, based on its stored reachability information currently indicating that mobile 62 may be reached at peer group 140, may choose to send the call set-up message via switch 130-1, peer group 135 and peer group 140 as the shortest path to reach peer group 140. However, the chosen route would actually turn out to be inefficient and would not be the shortest path, as is shown in FIG. 8 by the solid arrows.

Continuing with the above example, assume that the scope (S) has a value of 3 and a mobile endpoint (not shown) currently served by switch 135-3 transmits a call-setup request that involves mobile 62, FIG. 8. Since S=3, then the switches in group 135 will not receive the update data concerning mobile 62 when it moves from switch 140-6 to switch 130-3. Disadvantageously, the connection resulting from the call-setup request will be inefficiently routed to the home switch and then to the new switch location (i.e., from switch 135-3 to switch 140-6, back to switch 135-3 and then to switch 130-3).

The foregoing examples illustrate that a call setup request for a mobile may result in a circuitous path being established if the request arrives at a switch between the time a mobile has moved and the time that the resulting reachability update is received at a switch, or if the request is generated in a switch that is outside the scope S of the called party. Also note that if the called mobile is within the scope S of its home switch or the switch serving the calling party, then the inventive location management scheme routes the call over the shortest possible connection.

When a switch receives a call request message for a mobile before it receives reachability data for the mobile, a switch, e.g., switch 140-6, may use (as is done in the prior art) a dummy indicator, such as address 130-3.0 (where the "0" extension identifies a "mobile user"), in the called party number field of the call request message. This feature allows switch 135-3 to forward the connection to switch 130-3. Upon receiving the setup message, switch 130-3 associates the dummy address 130-3.0 number in the call setup message with a particular mobile. Switch 130-3 then looks for a mobile identifier parameter in the setup message which also contains the address of the called mobile 62. The dummy indicator/address is similar to the TLDN used in cellular networks, and the mobile identifier is the MIN (telephone number) used in cellular networks.

The establishment of an inefficient route as a result of a race between a call-setup message and pertinent reachability data discussed above may be dealt with if a switch receiving the call-setup message can determine the sequence of switches supporting the connection to the called mobile. Note that in the PNNI standard, a switch that receives a call setup request in a peer group determines the hierarchical route of the connection using the topology and loading data collected via the PNNI routing protocol for that peer group, as discussed above. That is, a PNNI signaling set-up message uses a parameter called DTL (Designated Transit List) to carry hierarchical source routes as disclosed in the aforementioned "af-pnni-0055.000" interface specification. A DTL, more specifically, identifies the switches forming a complete path/connection across a peer group. In accordance with the PNNI standards specification, the switch identifiers are removed from the DTLs after the connection has been set up across each peer group. Whereas, in accordance with an aspect of the invention, the switches allow the DTL to "grow" such that when a connection is completed, each segment of the connection has been recorded in the associated DTL, which is available to the terminating switch, e.g., switch 130-3. The terminating switch may then forward the DTL information to the originating switch (e.g., switch 120-2) in the reverse signaling message. Thus, either end of the connection may initiate the following route optimization scheme.

The inventive route optimization arrangement is performed in two steps. The first step identifies a so-called "switchover node/switch" that may be used to switch the connection from an established path to an optimized path. A new path segment is then established from the route optimization-initiating switch to the switchover node. So-called "Tail" signals are used in the second step to switch the call data from the old path to the new path while preserving the cell sequence.

The selection of a switchover node is done by examining the DTL recorded for the connection. Based on the relative position of the calling party's switch, and the home and visiting locations of the called mobile, one end of the connection identifies the switchover node. In some cases, such optimization may not be required. In other cases, a connection may be optimized, in which the optimization starts at one end of the established path and in which the other end of the connection identifies the switchover node. In the above example, the DTL would identify switches 120-2, 120-3, 125-2, 130-2, 130-1, 135-2, 140-6, 135-3, and 130-3, as shown in FIG. 8. In the instant case, switch 130-3 is the terminating switch and becomes the route optimization-initiating switch. Switch 130-1 is the switchover node. FIG. 8 illustrates (with a dark arrow) that a new segment is established between these two switches.

The second step redirects the sending of user data from the path that is being replaced ("previous/old") path to the new "optimized" path. As mentioned above, this is done using a so-called "Tail" signal to maintain the sequence of the cells that are being delivered to the called mobile. (Tail signals for improving routes for connections involved in a so-called wireless "hand-off" is disclosed in a number of different prior publications, see, for example, the article titled "Mobility and Connection Management in a Wireless ATM LAN" by K. Y. Eng, M. Karol, and M. Veeraraghavan, published in the IEEE Journal on Selected Areas in Communications; or the article titled "Efficient Routing of Information Between Interconnected Cellular Mobile Switching Centers", By K. S. Meier-Hellstern and G. P. Pollini and published in the IEEE/ACM Transactions on Networking, Vol. 3, No. 6, pp. 765–774, December 1995, which is hereby incorporated by reference. The switchover node (in the example involving switch 130-1) correlates the new and old paths, and sends a Tail signal to the route optimization-initiating switch (switch 130-3 in the illustrative example) via the previous/old path indicating cells for mobile 62 will no longer be sent via the previous path. Switch 130-3 responsive to the notification sends a Tail signal to the switchover node. After the Tail signals have been sent, then the route optimization-initiating node (e.g., switch 130-1) and the switchover node (e.g., switch 130-3) start sending newly-received cells via the new path. Since the previous/old path is typically longer than the optimized path, then cells sent via the new path may arrive before cells that are still being sent via the previous/old path. Therefore, the route optimization-initiating node and the switchover node need to buffer cells received via the new path until the Tail signal is received. All of the so-called transit nodes in the previous/old path may then release the connection in the appropriate direction upon receipt of the corresponding Tail signal. Route optimization is thus achieved while maintaining cell sequence, in accordance with an aspect of the invention.

In an alternative scheme, one which we call the Location Register (LR) scheme, an improved version of the location management aspects of the aforementioned IS-41 standard is used to track mobile users in a PNNI based ATM network, in which LRs (which are actually databases) are placed within the peer group structure of such an ATM network. Moreover, we use an improved combination of the aforementioned hierarchical scheme and flat scheme. Specifically, the LRs track the location of mobile terminals, and respond to location queries that may be generated prior to the setting up of a connection. Thus, unlike the prior art PNNI scheme, our LR scheme uses an explicit mobile location phase prior to connection setup.

More particularly, our scheme uses a hierarchy of location registers, in which, in accordance with an aspect of the invention, the hierarchy (or "tree") is limited to S levels, beyond which the inventive scheme resorts to the above-described flat scheme approach of updating/consulting a home location register to locate a mobile. It also uses a feature of "tunneling" a mobile's permanent address in a call setup message, as is done in the flat scheme. Advantageously, our hybrid scheme allows a network provider to implement either one of the two schemes or some in-between scheme by selecting a value for S that meets certain criteria, e.g., communication costs. Thus, by limiting the hierarchical tree to some level S, communication as well as computation costs are minimized.

Figure 9:
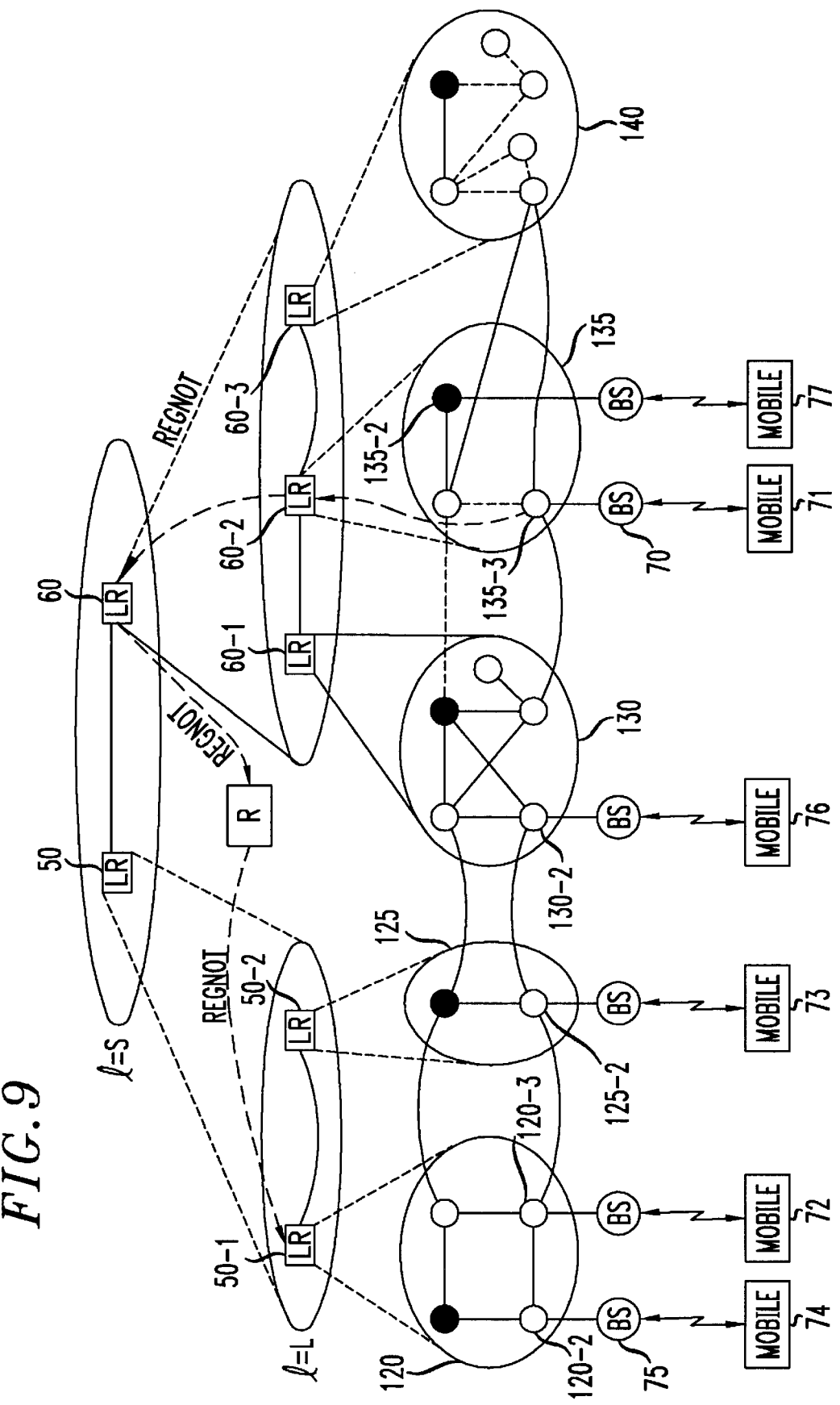
FIGS. 9 and 10 illustrate a network of switches arranged to implement the principles of another illustrative embodiment of our invention.

FIG. 9 shows the hierarchically-organized location registers, in which a switch is represented by a circle and a location register (LR) is represented by a square. It is seen that the location registers are associated with only level L and up to some level S. Assume that each peer group has one location register. (It is noted that this assumption may be relaxed and multiple location registers may be located in each peer group. This is effectively equivalent to creating a sublayer under the lowest layer of switches, and applying the same concept of allocating one LR per peer group of this new sublayer.)

Specifically, location register (LR) 50-1 tracks the mobiles served by the switches within peer group 120 (i.e., the mobiles located in the zones respectively served by the base stations (BS) connected to switches forming peer group 120). Similarly, location register 50-2 tracks the mobiles located in the zones respectively served by the base stations (BS) connected to switches forming peer group 125. (Note that a home location register is assigned to a mobile terminal based on the permanent address associated with the mobile.) The hierarchy of location registers facilitates localizing mobile tracking. However, if the hierarchy is carried to the topmost level (l=1) as in the hierarchical scheme disclosed in the article titled "A fully Distributed Location Registration Strategy for Universal Communication Systems", by J. Z. Wang, published IEEE Journal on Selected Areas in Communications, Vol. 11, August, 1993, pp. 850–860, which is hereby incorporated by reference, then the attendant search costs could be high. That is, it is more expensive to stop and process so-called REGNOT (Registration Notification) or LOCREQ (Location Request) messages at each LR in the hierarchy, than to send one such request and route it using a particular transport mechanism, such as the Internet Protocol (IP), in which a router only examines the packet header rather than the whole packet. We, therefore, limit system hierarchy to level S and resort to the flat scheme approach of updating and/or querying the home LR of the mobile. Also, only the home LR tracks the S level LR for each mobile, and only receives location queries when none of the LRs up to level S of the calling mobile's switch can respond to the location query.

Figure 14:
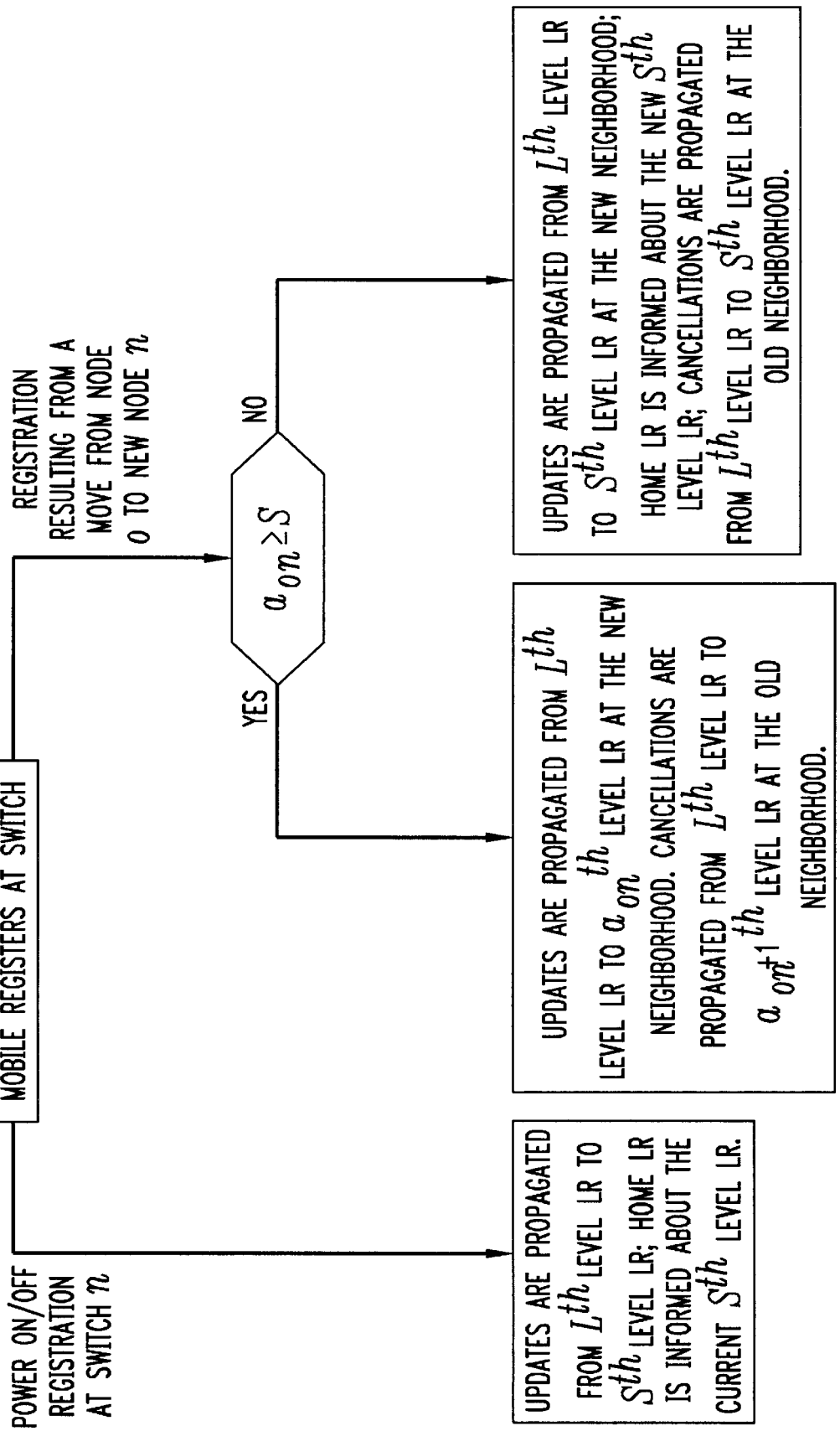

When a mobile end point "powers up", the switch connected to the base station serving that mobile receives a power-on registration message. The switch, in turn, sends a REGNOT (Registration Notification message) to its associated location register at level L. That LR register, in turn, generates and sends a REGNOT to the "ancestor" location registers upstream to an LR at level S (or the apex of the hierarchy), as described in FIG. 14. If the switch receiving the power-on registration ("visiting switch") is not the home switch, then the LR at level S sends a REGNOT identifying the current location of the mobile to the home LR associated with the mobile. For example, in FIG. 9 assume that a mobile 71 "powers up" while in a zone of a base station 70 connected to switch 135-3. This causes REGNOT messages to be sent from switch 135-3 to LR 60-2, and from LR 60-2 to LR 60 at level S. LR 60 stores the message in associated memory and notifies the home LR 50-1 of the current location of the mobile. The home LRs of all mobiles visiting at switches other than their home switch track the S level LR of the mobile in its current location.

For zone-change registrations, which are generated when a mobile moves from a base station connected to one switch to a base station connected to another switch, the hierarchy of location registers is exploited to limit the propagation of registration information for such movements. On receiving a registration message, the switch thereat sends a REGNOT message to its associated level LR. That LR, in turn, forwards the REGNOT message upwards up to the LR which is a common ancestor of the LR associated with the previous switch and the LR associated with the current switch, or up to level S, whichever is lower in the hierarchy (higher in numerical value). The current switch sends a message identifying the mobile's zone change to the previous switch. The previous switch then generates a REG-CANC (Registration Cancellation) message and sends the message to its associated level LR. The message propagates upwards, canceling the outdated information in the LRs. If the 5th level LR tracking the mobile changes due to the mobile changing locations, then the mobile's home LR is so notified, as is also decried in FIG. 14.

For example, if the mobile 74, FIG. 9, moves from a zone served by base station (BS) 75 to a zone served by a base station (not shown) connected to switch 120-3, then only LR 50-1 needs to be notified of the change. If, on the other hand, the mobile moves from switch 120-2 to a switch 125-2, then switch 125-2 sends REGNOTs to LR 50-2 which, in turn, sends a REGNOT to LR 50, since LR 50 is common to the previous and new switches. Also, since the LR at level (50) did not change, a REGNOT is not sent to the mobile's home LR. However, switch 125-2 sends a cancellation message to switch 120-2, which in turn generates and sends a REG-CANC to switch 50-1. Also, if the mobile moves from switch 120-2 to switch 130-2, then a REGNOT message propagates from switch 130-2 to LR 60-1, and then to LR 60. Since the level LR tracking the mobile changes, then LR 60 notifies the home LR 50-1. In addition, switch 130-2 generates and sends a REGCANC message to switch 125-2, which then passes that message upwards to LR 50-2, and then to LR 50.

Note that a power-off registration is handled similarly, in which an LR up to level S is informed that power has been turned off at a mobile. If the mobile was not in its home zone at that time, but was visiting another zone, then its home LR is also notified of the power-off condition.

To locate a mobile prior to the sending of a call setup message, a chain of location registers is traced, where the length of the chain depends on the location of the calling party and the current location of the called mobile.

The called party's switch initiates the location search by checking to see if the called mobile is located at a base station in its domain (zone). If so, it completes the call without generating a LOCREQ (Location Request message).

If the called mobile is not located at a base station within its domain, the called party's switch generates and sends a LOCREQ to its associated LR. Such requests are forwarded upwards in the hierarchy of LRs if information is not available at the LR that receives a LOCREQ from the switch. If an LR at some level k has such information (i.e., a pointer to a child LR) regarding the location of the mobile, then it sends a LOCREQ downwards toward the called mobile's current location. The location query is then resolved by the level L location register associated with the switch covering the zone in which the called mobile is currently located. The latter switch generates and sends a response directly to the calling party's switch.

Figure 10:
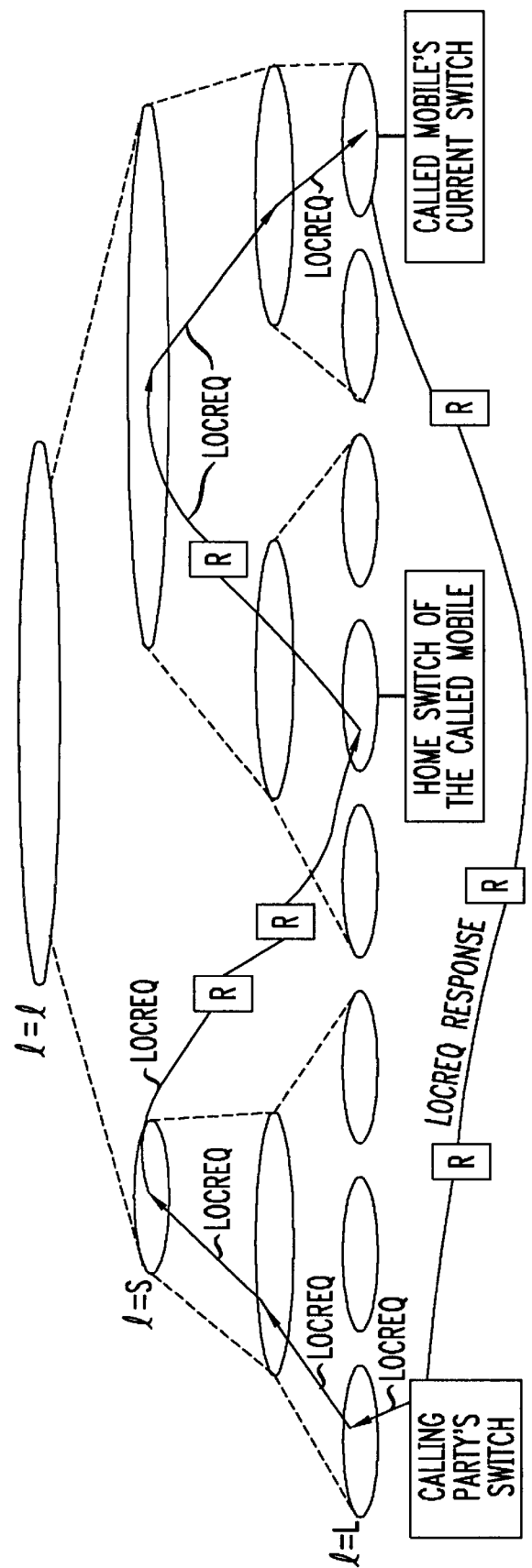

However, if the LRs, from the level L LR of the calling party's switch to the S level LR do not have information regarding the location of the called mobile, as shown in FIG. 10, then the S level LR sends a LOCREQ to the home LR of the called mobile. Since this home LR tracks the S level LR of its associated mobiles, it forwards the LOCREQ to the S level LR tracking the mobile in its current location. The latter LR then generates and sends a LOCREQ downward in the hierarchy according to the information it has about the called mobile. The LOCREQ should reach the level L LR of the called mobile's switch. A response is then sent directly from the latter LR to the calling party's switch as shown in FIG. 10.

The level L LR associated with the called mobile's switch responds to the LOCREQ with a dummy Temporary Directory Local Number (TLDN) using the information provided by the called mobile's switch, as suggested in the flat location scheme described above. The latter level L LR then sends a response to the location query directly to the calling party's switch. The calling party's switch, in turn, initiates a call setup using the TLDN contained in the response that it received from the level L location register. The latter switch also includes the MIN (Mobile Identification Number) associated with the called mobile as a parameter in the setup message. The setting up of the call then proceeds using PNNI signaling, which determines the route of the ensuing connection based on the assigned TLDN. When the setup message reaches the called mobile's switch, then that switch (a) generates a page using the MIN of the mobile, (b) locates the base station serving the mobile and (c) completes call setup.

For example, assume that three different endpoints, 77, 76 and 73, originate respective calls to mobile 71 (see FIG. 9). In a first example, when switch 135-2 generates and sends a LOCREQ for mobile 71 to its location register 60-2, register 60-2 responds since the called mobile 71 is located within the region served by register 60-2. In a second example, switch 130-2 sends a LOCREQ (in response to a call setup request from endpoint 76 to mobile 71) to its location register 60-1. Since location register 60-1 does not have a pointer to mobile 71, then register 60-1 simply generates and sends a LOCREQ to the next higher-level location register 60, which has a pointer indicating that LR 60-2 is tracking mobile 71. Hence LR 60 sends a LOCREQ to location register 60-2. Since register 60-2 is the level LR for the called mobile, it responds with a TLDN indicating that the mobile is located at switch 135-3. This response is sent directly to switch 130-2 (instead of retracing the pointers backwards), thereby allowing switch 130-2 to send a call setup request to the called mobile's switch.

In the example involving the sending of a call setup request from endpoint 73 to mobile endpoint 71, the ensuing LOCREQ sent by switch 125-2 traverses the chain of location registers 50-2 and 50. Since neither of these location registers have information identifying the location of the called mobile, then, in that case, location register 50 sends a LOCREQ to the called mobile's associated home location register 50-1. The latter location register then forwards the LOCREQ to location register 60, since each home location register tracks the level S location registers of mobiles associated with that home location. LOCREQ messages are then forwarded downwards in the hierarchy, from location register 60 to location register 60-2, which returns the TLDN for the mobile.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. A network comprising a plurality of switches, said switches being formed into respective peer groups, said peer groups being formed into a hierarchical logical network of L levels, where $L \geq 1$, each of said switches being associated with a plurality of base stations each operative for communicating with wireless terminals located in respective cells, individual ones of said switches serving as a home switch for respective ones of said wireless terminals, said network further comprising at one of said switches, responsive to receiving from an associated base station a registration message originating from one of said wireless terminals, generating a message containing information relating to the current location of said one of said wireless terminals and sending the message to the other switches that are within S levels of said one of said switches and to a switch previously serving said one of said wireless terminals, at each of said other switches, responsive to receipt of said message, updating an associated reachability database to indicate the current location of said one of said wireless terminals, and at said switch previously serving said one of said wireless terminals, responsive to receipt of said message, setting a pointer pointing to the current location of said one of said wireless terminals, and wherein if said one of said wireless terminals is not within scope S of said previous switch, then said previous switch responsive to receipt of said message, updates an associated reachability database to indicate that said one of said wireless terminals may be reached via a home switch associated with said one of said wireless terminals.

2. The network of claim 1 wherein said peer groups form a PNNI network.

3. The network of claim 1 wherein said previous switch sends the reachability update information to each of the switches that are within scope S of said previous switch, and wherein each switch that receives the update information then updates its own reachability database to indicate that said one of said wireless terminal may be reached via the home switch associated with said one of said wireless terminals.

4. A network comprising a plurality of switches, said switches being formed into respective peer groups, said peer groups being formed into a hierarchical logical network of L levels, where $L \geq 1$, each of said switches being associated with a plurality of base stations each operative for communicating with wireless terminals located in respective cells, individual ones of said switches serving as a home switch for respective ones of said wireless terminals said network further comprising

- at one of said switches, responsive to receiving from an associated base station a registration message originating from one of said wireless terminals generating a message containing information relating to the current location of said one of said wireless terminals and sending the message to the other switches that are within S levels of said one of said switches and to a switch previously serving said one of said wireless terminals,
- at each of said other switches, responsive to receipt of said message, updating an associated reachability database to indicate the current location of said one of said wireless terminals,
- at said switch previously serving said one of said wireless terminals, responsive to receipt of said message, setting a pointer pointing to the current location of said one of said wireless terminals, wherein if said
- one of said wireless terminals is not within scope S of said previous switch, then said previous switch, responsive to receipt of said message, updates an associated reachability database to indicate that said one of said wireless terminals may be reached via a home switch associated with said one of said wireless terminals, and
- in said one switch, responsive to said home switch being outside of the scope of said one switch, sending said message to the home switch.

5. The network of claim 4 further comprising

- in the home switch, responsive to receipt of said message, updating a forwarding pointer so that the forwarding pointer points to a neighborhood in which said one terminal is located, in which said neighborhood includes all of the switches within scope S of said one wireless terminal.

6. The network of claim 5 wherein said previous switch has an identity that is an Internet Protocol address.

7. The network of claim 1 further comprising at said one wireless terminal, responsive to generating said registration message, including an identity associated with said previous switch in said registration message and then sending the registration message over the air to a base station serving a zone in which said one wireless terminal is currently located.

8. The network of claim 1 further comprising

- at said one switch, generating a message containing an identity of said one switch and sending the latter message to said one wireless terminal.

9. The network of claim 8 wherein the identity of said one switch is an Internet Protocol address.

10. The network of claim 1 wherein said network further comprises a plurality of routers forming a router network interconnected with individual ones of said switches and wherein said registration message is routed over said network via said router network.

11. A network comprising a plurality of switches, said switches being formed into respective peer groups, said peer groups being formed into a hierarchical logical network of L levels, where L≧1, each of said switches being associated with a plurality of base stations each operative for communicating with wireless terminals located in respective cells, individual ones of said switches serving as a home switch for respective ones of said wireless terminals, said network further comprising

- at one of said switches, responsive to receiving from an associated base station a registration message originating from one of said wireless terminals, generating a message containing information relating to the current location of said one of said wireless terminals and sending the message to the other switches that are within S levels of said one of said switches and to a switch previously serving said one of said wireless terminals,
- at each of said other switches, responsive to receipt of said message, updating an associated reachability database to indicate the current location of said one of said wireless terminals,
- at said switch previously serving said one of said wireless terminals, responsive to receipt of said message, setting a pointer pointing to the current location of said one of said wireless terminals, and
- at another one of said switches, responsive to receiving a call for said one wireless terminal, reading from its associated database reachability information associated with said one wireless terminal and routing the call to said one wireless terminal as a function of the read reachability information.

12. The network of claim 11 further comprising

- at a home switch associated with one wireless terminal, responsive to receiving said call, forwarding the call to said one of said switches in conjunction with sending an associated call set-up message to said one of said switches.

13. The network of claim 12 wherein said home switch inserts a dummy indicator in said call set-up to indicate the current location of said one wireless terminal.

14. The network of claim 11 further comprising

- at said previous switch, responsive to receiving said call, forwarding the call to said one of said switches.

15. The network of claim 14 wherein said previous switch inserts a dummy indicator in said call set-up to indicate the current location of said one wireless terminal.

16. The network of claim 11 further comprising

- at another one of said switches, responsive to receiving a call request message for said one wireless terminal forwarding said request message to a location identified in said reachability database for said one wireless terminal.

17. The network of claim 1 further comprising

- at another one of said switches, responsive to receiving a call request message for said one wireless terminal in which the call request message contains a dummy indicator, forwarding said request message to a next one of the switches identified as a function of the dummy indicator.

18. The network of claim 12 further comprising

- in each of the switches forming a route from a first one of the switches receiving said call request message to a second one of the switches now serving the cell in which said one wireless terminal is now located, inserting its identity in a connection list in the request message when it is received and forwarding the request message to a next one of the switches forming said route.

19. The network of claim 11 further comprising

- at said second one of the switches, responsive to receipt of the call request, forwarding a copy of the connection list contained in the received call request message to said first one of the switches.

20. The network of claim 12 further comprising

- at said first one of the switches, responsive to receipt of the connection list, optimizing the path to said second one of the switches and redirecting the sending of cells to said one wireless terminal over said optimized path by appending a tail cell to a queue of cells addressed to said one wireless terminal and effectuating said redirection when said tail cell reaches the top of said queue such that newly received messages addressed to said one wireless terminal are thereafter forwarded over the optimized path.

21. The network of claim 12 further comprising at said second one of the switches, responsive to receipt of the call set-up message, optimizing the path to said first one of the switches and redirecting the sending of cells originated by said one wireless terminal over said optimized path by appending a tail cell to a queue of such originated cells that are to be sent to said first one of the switches and effectuating said redirection when said tail cell reaches the top of said queue such that new cells originated by said one wireless terminal are thereafter forwarded over the optimized path.

22. The network of claim 5 wherein said previous switch has an identity that is an NSAP address.

23. The network of claim 11 wherein each user terminal served by said network is associated with a respective scope value S.

24. A network comprising a plurality of switches, said switches being formed into respective peer groups, said peer groups being formed into a hierarchical logical network of L levels, where L≧1, each of said switches being associated with a plurality of base stations each operative for communicating with wireless terminals located in respective communications cells, individual ones of said switches serving as a home switch for respective ones of said wireless terminals, said network further comprising at one of said switches, responsive to receiving from an associated base station a registration message originating from one of said wireless terminals, generating a message containing information relating to the current location of said one of said wireless terminals and sending the message to the other switches that are within S levels of said one of said switches, and at each of said other switches, responsive to receipt of said message, updating an associated reachability database to indicate the current location of said one of said wireless terminals.

25. A network comprising a plurality of switches, said switches being formed into respective peer groups, said peer groups being formed into a hierarchical logical network of L levels, where L≧1, each of said switches being associated with a plurality of base stations each operative for communicating with wireless terminals located in respective communications cells, individual ones of said switches serving as a home switch for respective ones of said wireless terminals, said network further comprising at one of said switches, responsive to receiving from an associated base station a registration message originating from one of said wireless terminals, generating a message containing information relating to the current location of said one of said wireless terminals and sending the message to the other switches that are within S levels of said one of one of said switches and to a switch previously serving said one of said wireless terminals, at each said other switches, responsive to receipt of said message, updating an associated reachability database to indicate the current location of said one of said wireless terminals, and at said switch previously serving said one of said wireless terminals, responsive to receipt of said message, setting a pointer pointing to the current location of said one of said wireless terminals and updating an associated reachability database to indicate that said one of said wireless terminals may be reached via the home switch associated with said one of said wireless terminals if said previous switch is outside of the scope S of said one of said switches.

26. A wireless network comprising a plurality of switches formed into respective peer groups, each of said switches being associated with a plurality of base stations each operative for communicating with wireless terminals located in a respective communications zone, individual ones of said switches serving as a home switch for respective ones of said wireless terminals, and a plurality of location registers formed into S levels of location registers such that each of the location registers forming a first level of location registers is associated with a respective one of said peer groups of switches and such that each location register in a succeeding level of location registers is associated hierarchically with a group of location registers in a preceding level of location registers, where S≧1, wherein each of said first level of location registers is operative for tracking the location of wireless terminals currently served by base stations connected to one of the switches forming the respective one of said peer groups and each succeeding level of location registers is operative for tracking the location of wireless terminals currently tracked by the location registers forming the preceding level of location registers.

27. The wireless network of claim 26 further comprising at one of said switches, responsive to receipt of a registration message originated by one of said wireless terminals, sending a registration message identifying said one of said switches and identity of the base station serving the wireless terminal that originated the registration message to the associated one of the location registers in said first level of location registers, which then updates the information identifying the current location of the wireless terminal.

28. The wireless network of claim 27 wherein said associated level location register further operates to cause the identifying information to be sent to each higher level location register in the hierarchy which does not have that information.

29. The wireless network of claim 27 wherein if the associated next higher level location register is at the S level in said hierarchy, then that location register sends the registration message to the home switch if said one switch is not within the scope S of the last one of the switches to serve the wireless terminal.

30. The wireless network of claim 27 further comprising at said one of said switches, responsive to receipt of the registration message, sending a registration cancellation message to another one of said switches which last served said wireless terminal, said other one of said switches being operative for sending the cancellation message to its associated location register.

31. The wireless network of claim 27 further comprising at said one of said switches, responsive to receipt of the registration message, sending a registration cancellation message to another one of said switches which last served said wireless terminal, said other one of said switches being operative for sending the cancellation message to its associated location register only if said other one and said one of said switches are not in the same peer group.

32. The wireless network of claim 31 wherein said associated location register operates to update its information relating to said wireless terminal and to send the cancellation message to an associated location register at a next higher level in said hierarchy.

33. The wireless network of claim 26 further comprising
at another one of said switches, responsive to receipt of a call addressed to another one of the wireless terminals, forwarding said call to the other one of the wireless terminals if that wireless terminal is within a cell location served by a base station associated with said other one of said switches, if the other one of the wireless terminals is not in within any cell served by any base station associated with the other one of said switches, then said other one of said switches generates a location request message and sends that request message to its associated location register.

34. The wireless network of claim 33 wherein said location register associated with said other one of said switches, responsive to receipt of the location request message and responsive to not having information relating to the location of the said other wireless terminal, sends the location request message to a next higher level location register, and, responsive to having such information, sends information relating to the location of said other wireless terminal to said other one of said switches.

35. The wireless network of claim 33 wherein said location register associated with said other one of said switches, responsive to receipt of the location request message and responsive to not having information relating to the location of the said other wireless terminal, forwards the location request message to a higher level location register so that the request message may then propagate upwards through said hierarchy of location registers until it is received by a location register having information relating to the location of said other wireless terminal.

36. The wireless network of claim 35 wherein when said request message is received upwards by a location register positioned at the S level in the hierarchy of location registers and that location register does not have such information, then that location register forwards the location request to the home switch associated with the other wireless terminal, the home switch, responsive to receipt of the location request, forwards the location request to the location register that is positioned at the S level in the hierarchy and currently tracking the location of the other wireless terminal.

37. The wireless network of claim 35 wherein each of said location registers positioned above a first level in the hierarchy of location registers, responsive to receipt of the location request and responsive to having partial information relating to the location of the other wireless terminal, forwards the location request to an associated location register positioned at a next, lower level in said hierarchy and having the additional information relating to the location of the other wireless terminal, and wherein the location register positioned at the first level returns the information relating to the location of the other wireless terminal to said other one of said switches.

38. The wireless network of claim 36 wherein each of said location registers positioned above a first level in the hierarchy of location registers, responsive to receipt of the location request and responsive to having partial information relating to the location of the other wireless terminal, forwards the location request to an associated location register positioned at a next, lower level in said hierarchy and having the additional information relating to the location of the other wireless terminal, and wherein the location register positioned at the first level returns the information relating to the location of the other wireless terminal to said other one of said switches.

39. The wireless network of claim 26 wherein the value of S may be different for different wireless networks.

\* \* \* \* \*